June 14, 1966  M. B. CONRAD  3,255,822
ACTUATOR DEVICE

Filed March 26, 1962  11 Sheets-Sheet 1

INVENTOR.
MARTIN B. CONRAD

BY

ATTORNEYS.

June 14, 1966 M. B. CONRAD 3,255,822
ACTUATOR DEVICE
Filed March 26, 1962 11 Sheets-Sheet 2

INVENTOR.
MARTIN B. CONRAD
BY
Lyon & Lyon
ATTORNEYS.

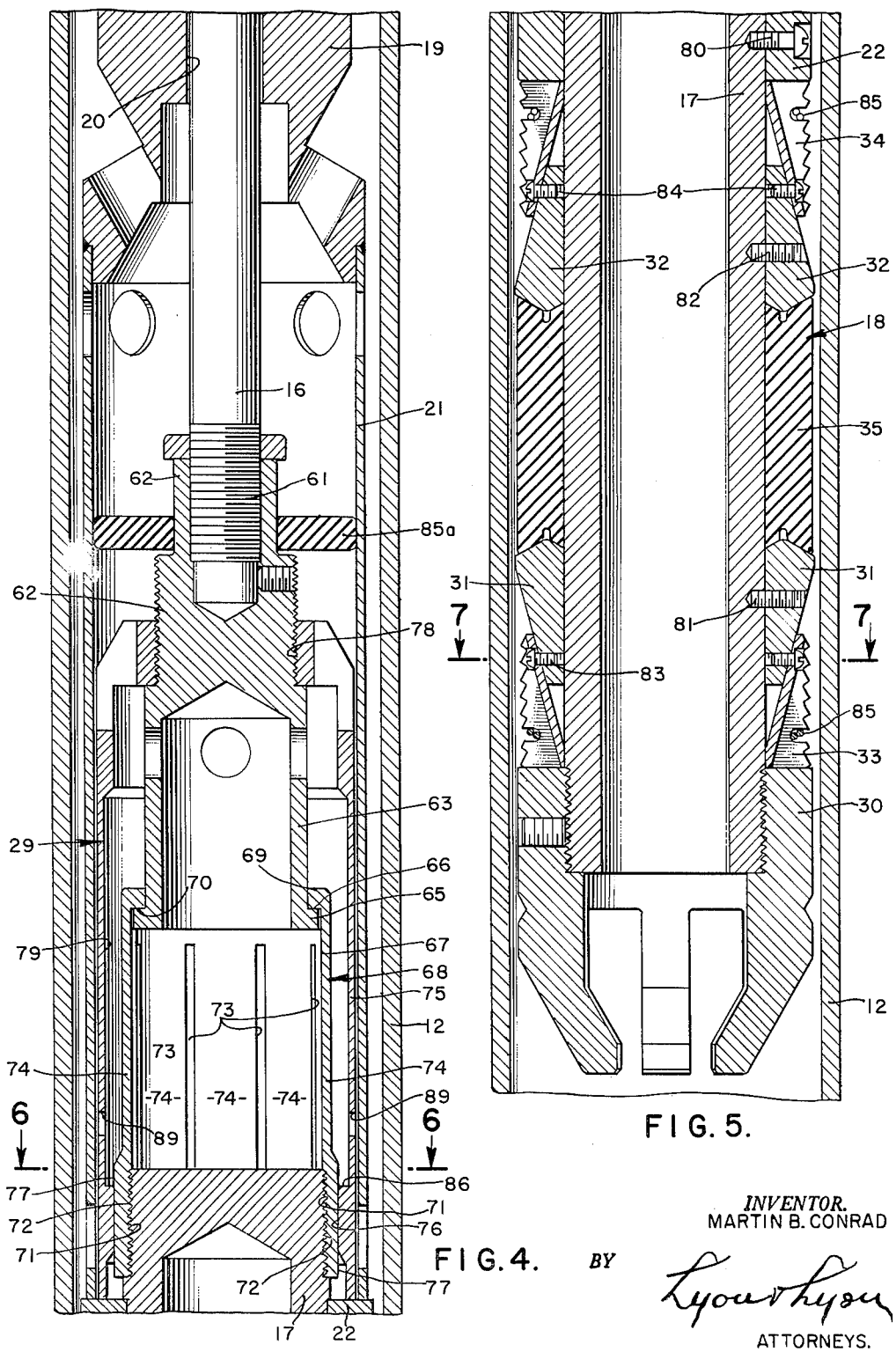

June 14, 1966

M. B. CONRAD 3,255,822

ACTUATOR DEVICE

Filed March 26, 1962

INVENTOR.
MARTIN B. CONRAD

BY
*Lyon+Lyon*
ATTORNEYS.

June 14, 1966 M. B. CONRAD 3,255,822
ACTUATOR DEVICE
Filed March 26, 1962 11 Sheets-Sheet 5
FIG.10.
FIG.11.
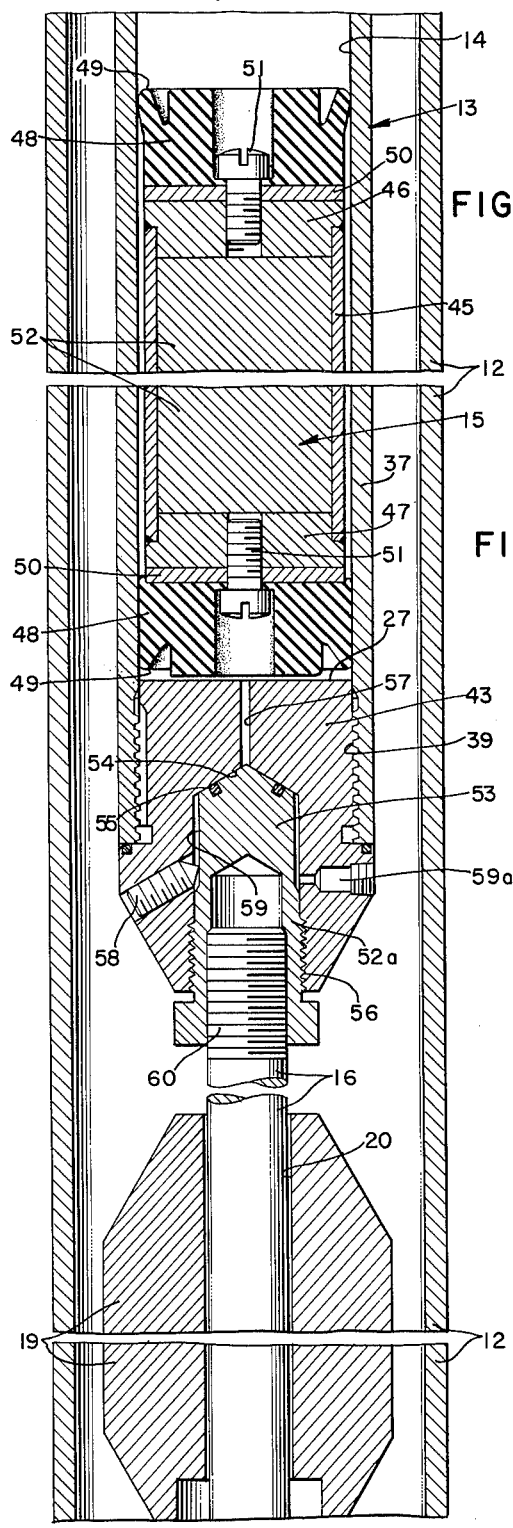
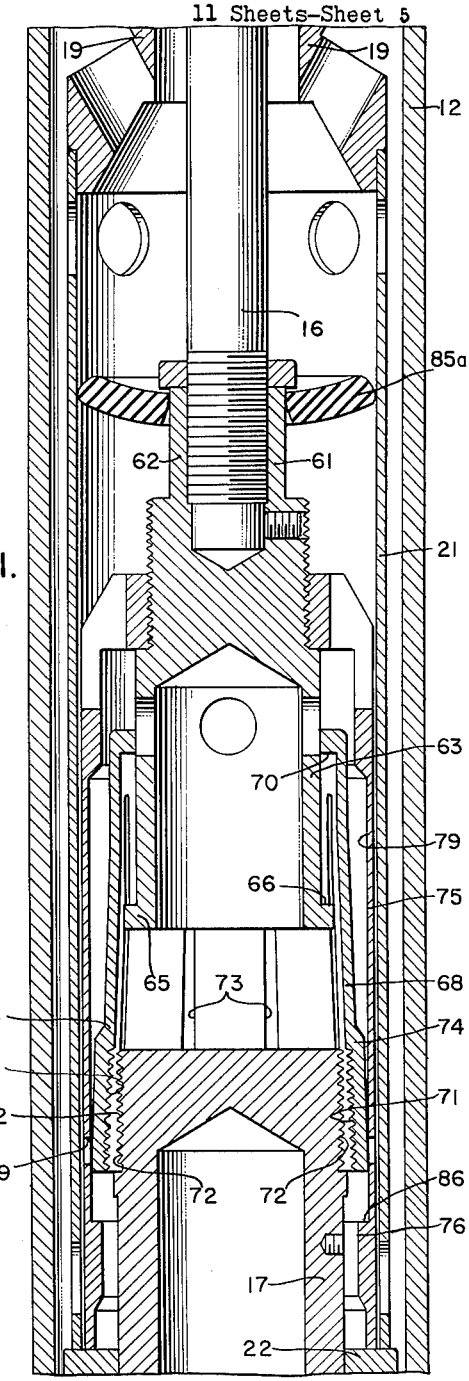
INVENTOR.
MARTIN B. CONRAD
BY
Lyon+Lyon
ATTORNEYS.

June 14, 1966  M. B. CONRAD  3,255,822
ACTUATOR DEVICE

Filed March 26, 1962  11 Sheets-Sheet 6

*INVENTOR.*
MARTIN B. CONRAD

BY

ATTORNEYS.

June 14, 1966

M. B. CONRAD 3,255,822

ACTUATOR DEVICE

Filed March 26, 1962

INVENTOR.
MARTIN B. CONRAD

BY

ATTORNEYS.

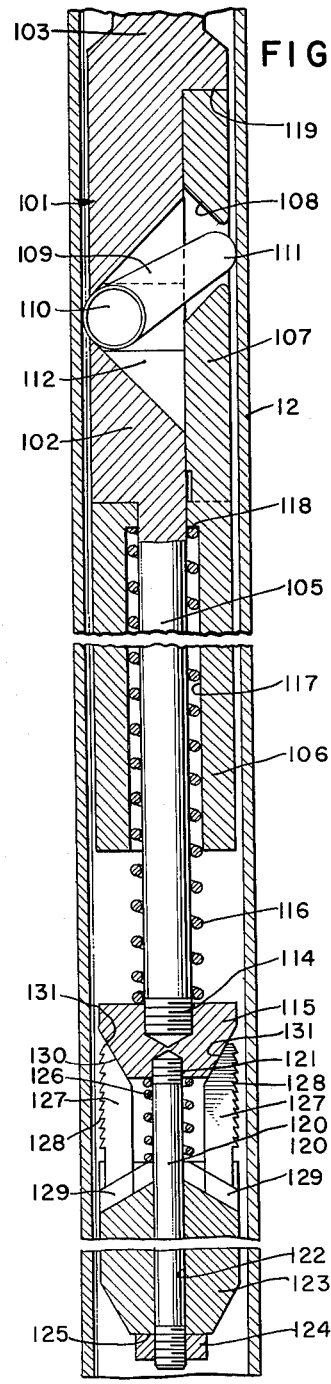
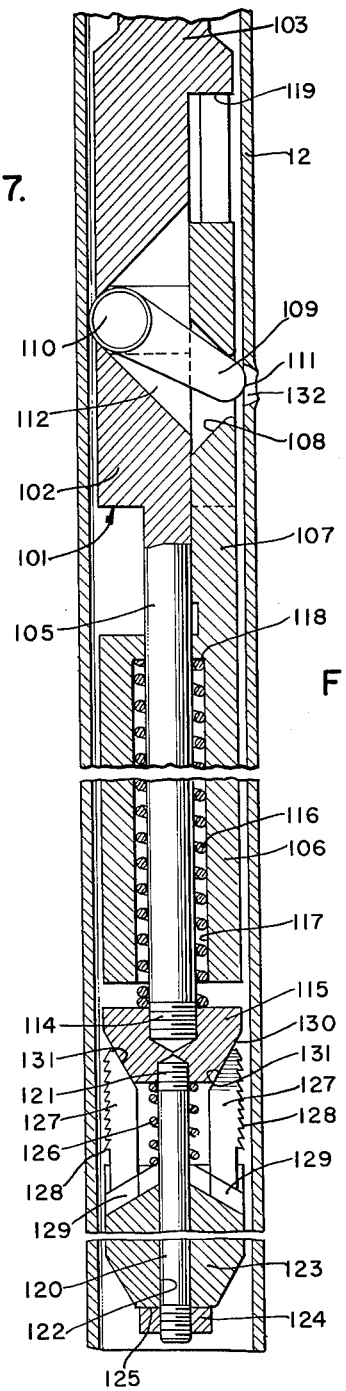
FIG. 17.
FIG. 18.
FIG. 19.
INVENTOR.
MARTIN B. CONRAD

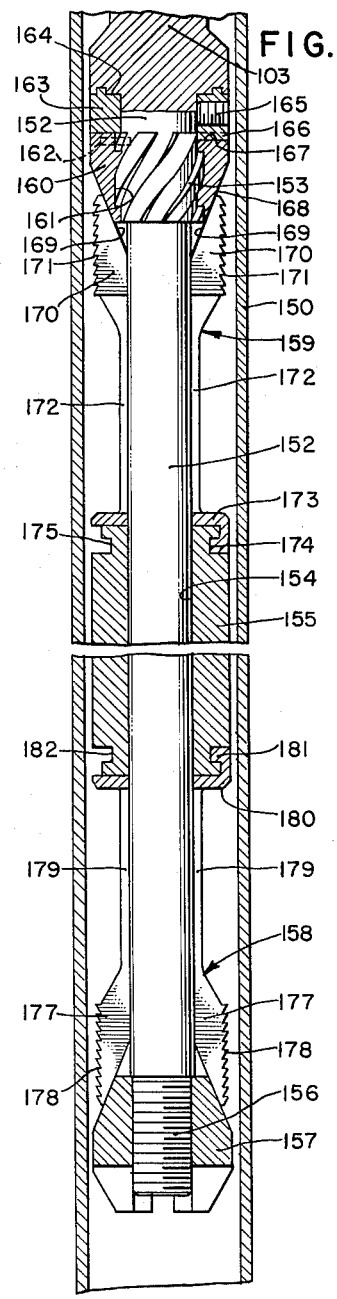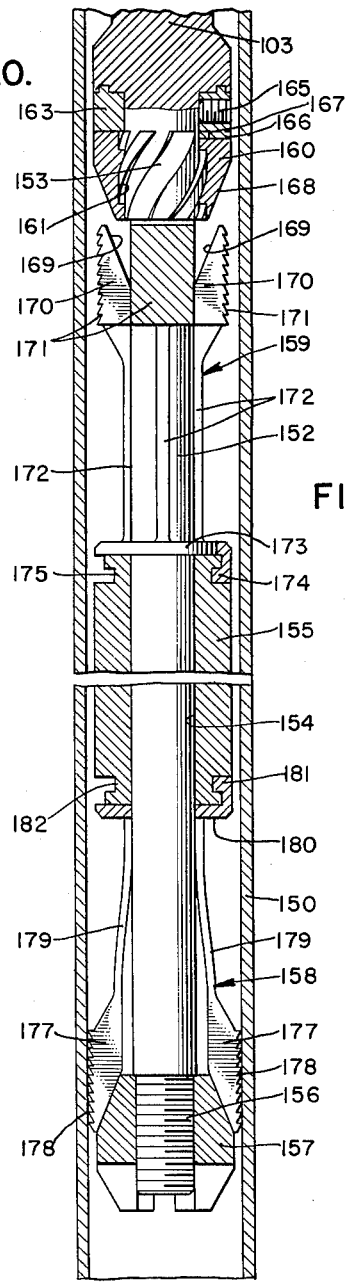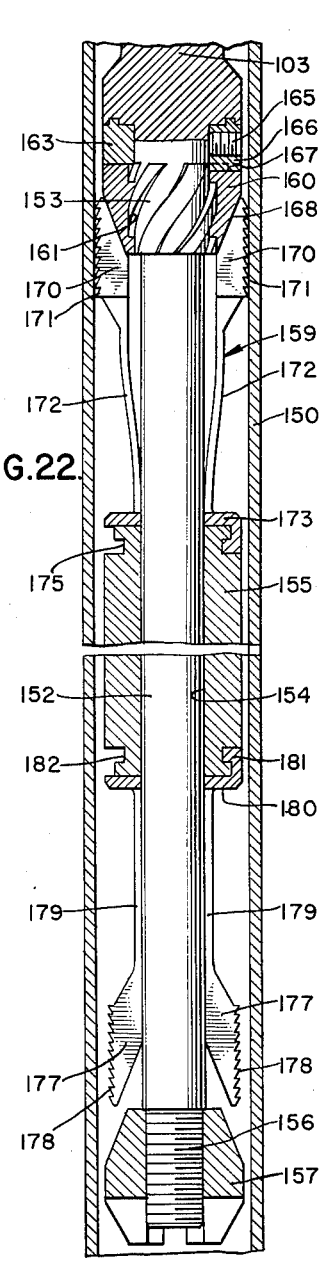

June 14, 1966 M. B. CONRAD 3,255,822
ACTUATOR DEVICE
Filed March 26, 1962 11 Sheets-Sheet 10

INVENTOR.
MARTIN B. CONRAD
BY
ATTORNEYS.

June 14, 1966    M. B. CONRAD    3,255,822
ACTUATOR DEVICE

Filed March 26, 1962    11 Sheets-Sheet 11

INVENTOR.
MARTIN B. CONRAD
BY
*Lyon & Lyon*
ATTORNEYS

United States Patent Office 3,255,822
Patented June 14, 1966

3,255,822
ACTUATOR DEVICE
Martin B. Conrad, 9326 Rives Ave., Downey, Calif.
Filed Mar. 26, 1962, Ser. No. 182,362
20 Claims. (Cl. 166—55.3)

This invention relates to force generating apparatus and is particularly directed to an actuator which makes use of inertia forces in operating a driven mechanism. This invention will be described in connection with an actuator or force generating device for use with apparatus in a well, such as apparatus for setting a bridge plug or a packer, or for operating a set of jars, or punching a hole laterally in the casing, or enlarging a tight spot in the casing, but it is to be understood that these examples are by way of illustration only and not by way of limitation.

Packer setting tools operated by a powder charge have been used but such devices do not employ a free piston nor do they develop power by inertia forces. Instead, the piston drives a piston rod which extends through an opening in one end of the housing. A packing device is provided on the end of the housing to form a sliding seal with the piston rod. The housing and the piston rod are then connected to the parts of the bridge plug which are relatively axially movable, so that when the powder charge is ignited the bridge plug parts are moved relatively to "set" position. A serious drawback of this type of device is that hydrostatic pressure developed by a column of fluid in the well has a marked effect on the operation of the device because such hydrostatic pressure acts on the exposed area of the piston rod and provides a force which varies with the height of the column of fluid thereabove and which must be overcome by the powder charge.

A principal object of this invention is to provide a novel form of inertia type actuator. Another is to provide an actuator having an internal free piston adapted to be driven by an explosive charge. Another object is to provide such an actuator for use in a well casing for performing various operations such as setting a bridge plug, or applying force to a casing perforator, side-wall sampler, cementing tool, or the like. Another object is to provide an actuator which operates substantially independently of the height of the fluid column within the well. Another object is to provide an actuator particularly adapted for use with a releasable connection of novel design for attaching the actuator to a work element. Another object is to provide such a device which may be constructed to be free of frangible release elements and to avoid leaving a broken steel part within the work element after release therefrom. Another object is to provide such an actuator which is particularly adapted for setting of very small bridge plugs. Another object is to provide an actuator of the type described in which the recoil is rapid but of short length in order to avoid tangling of the wire line which supports the device in the well hole.

Other objects are to provide an actuator of the type described having a significantly smaller powder charge for performing the same work, having a relatively low number of fluid sealing elements embodied therein, having a construction wherein the pressure remaining within the device after firing is relatively low, and which device is easier to service than prior devices and simpler to clean.

Briefly stated, a preferred embodiment of this invention utilizes a weighted free piston mounted to move axially within a bore of a housing. The bore is closed at both ends. Compressed air or other gas in the lower end of the bore initially holds the piston in an elevated position within the housing. An explosive charge is then fired within the bore and above the piston. The housing moves upward as the piston moves downward, further compressing the air. A rod connected to the housing extends downward therefrom to operate a work element, for example: a bridge plug. The rod extends freely through an inertia weight which rests on one part of the bridge plug, and upward movement of the rod relative to the inertia weight is effective to set the bridge plug within the well casing. The weighted piston and housing reverse directions of travel at the end of their respective strokes under the force of the highly compressed air, and the rod is accordingly forced downward immediately after its upward movement. This reverse movement of the rod is advantageously employed to release the connection between the rod and the bridge plug, as well as to apply a force further seating certain of the bridge plug slips.

In the drawings:

FIGURE 4 is a sectional view comprising a continuation of the lower end of FIGURE 3.

FIGURE 5 is a sectional view comprising a continuation of the lower end of FIGURE 4.

FIGURE 10 is a sectional view similar to FIGURE 3 but showing the free piston in its lowermost position.

FIGURE 11 is a sectional view comprising a continuation of the lower end of FIGURE 10.

FIGURE 17 is a sectional view of a work device adapted to form a lateral hole in the casing, the parts being shown in initial position.

FIGURE 18 is a view similar to FIGURE 17 showing the position of the parts at the end of the upstroke of the actuator.

FIGURE 19 is a view similar to FIGURE 18 showing the final position of the parts.

FIGURE 20 is a sectional view of a work device for applying to the casing a sudden jarring load in either axial loading or torque loading, the parts being shown in initial position.

FIGURE 21 in a view similar to FIGURE 20, the parts being shown at the end of the upstroke of the actuator.

FIGURE 22 is a view similar to FIGURE 21, the parts being shown in final position.

Figure 23:
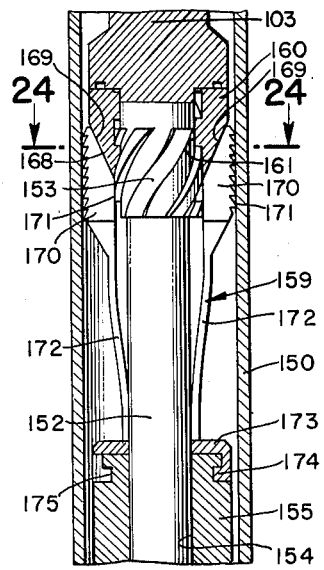

FIGURE 23 is a sectional detail similar to the upper end of FIGURE 22 but showing the filler ring moved so that the device may apply a torque load to the casing.

Figure 24:
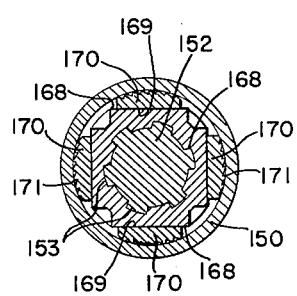
Figure 25:
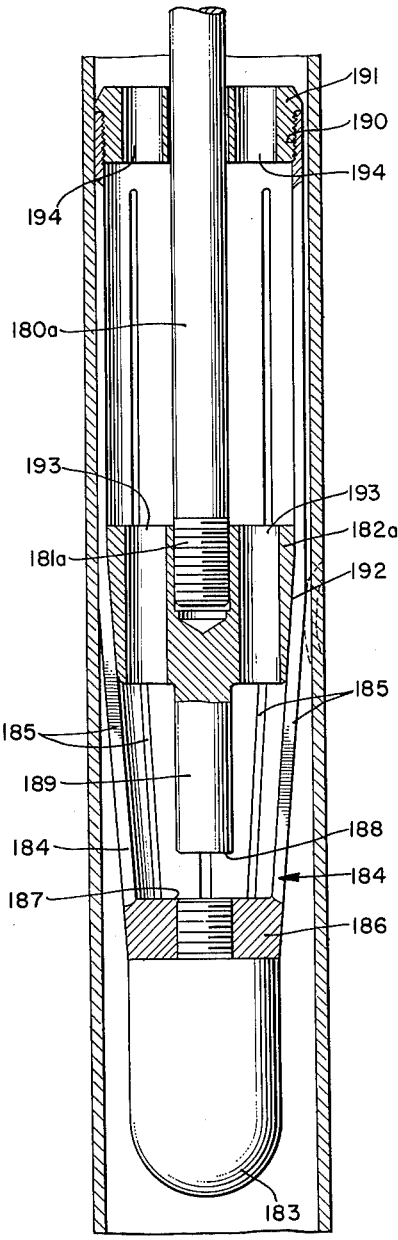

FIGURE 24 is a transverse sectional view taken substantially on the lines 24—24 as shown in FIGURE 23, FIGURE 25 is a longitudinal sectional view of a work device for expanding the casing internally to remove tight spots therefrom.

Figure 26:
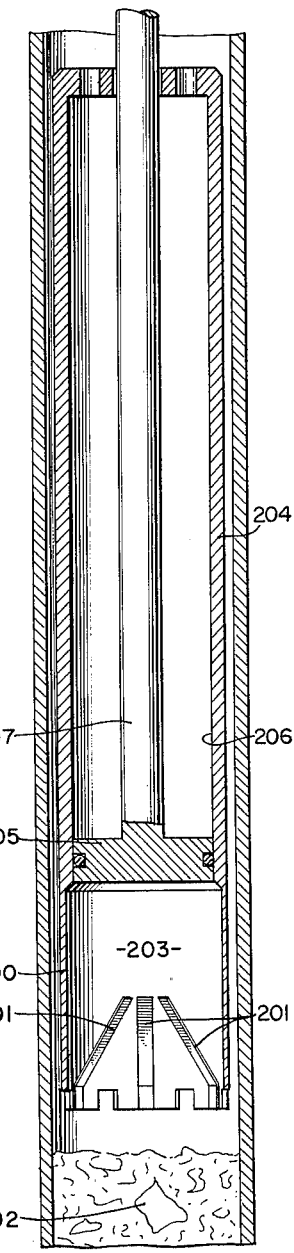

FIGURE 26 is a longitudinal view showing a work device which operates as a junk bailer.

Figure 27:
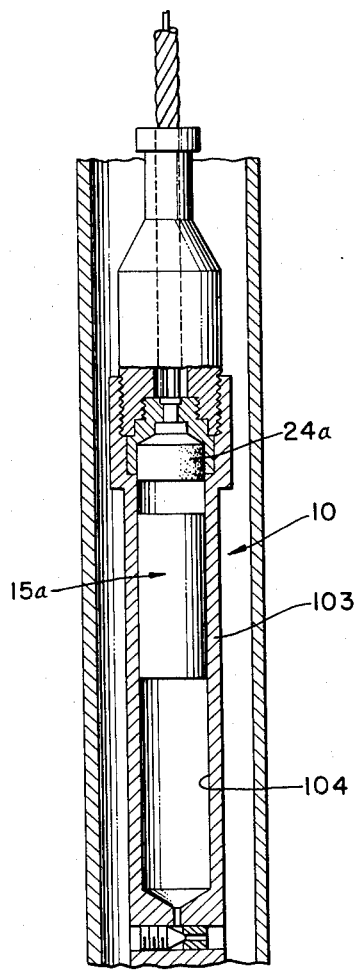

FIGURE 27 is a diagrammatic illustration in longitudinal section showing an actuator for use with the devices of FIGURES 17–23.

Figure 1:
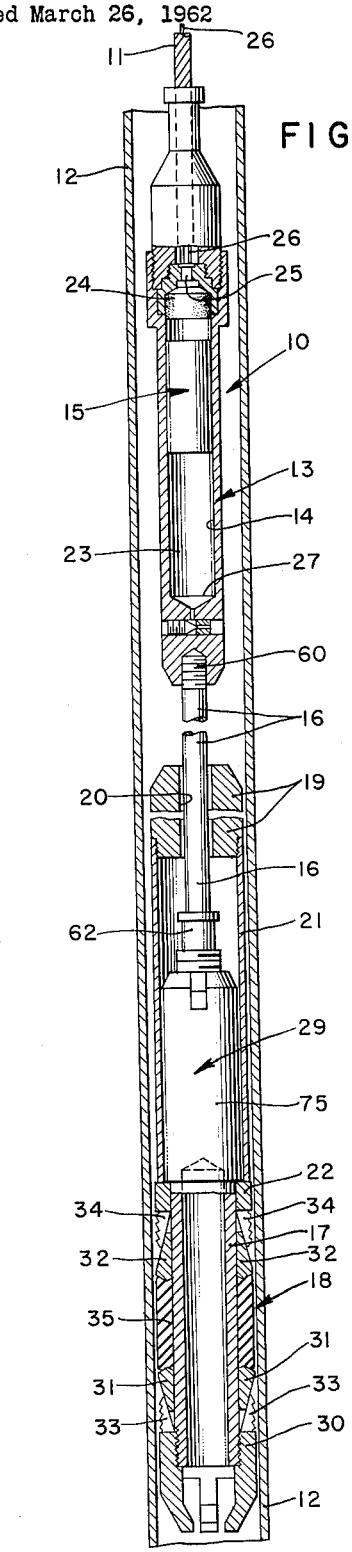
FIGURE 1 is a diagrammatic illustration in longitudinal section showing a preferred embodiment of this invention.
Figure 6:
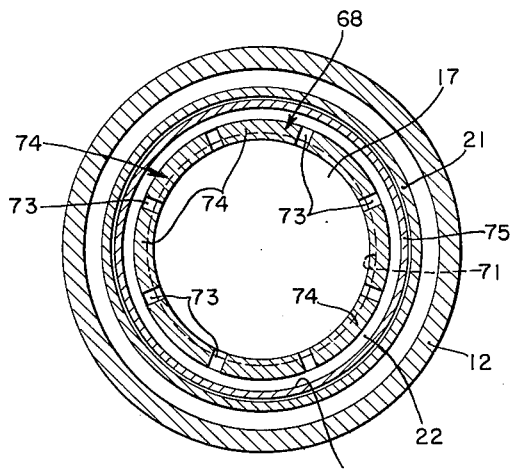
FIGURE 6 is a transverse sectional view taken substantially on the lines 6—6 as shown in FIGURE 4.
Figure 7:
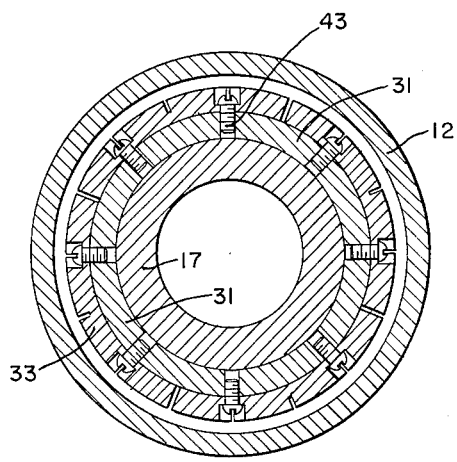
FIGURE 7 is a transverse sectional view taken substantially on the lines 7—7 as shown in FIGURE 5.

Referring to the diagrammatic representation in FIGURE 1 of the drawings, the actuator assembly generally designated 10 is adapted to be suspended from a wire line 11 and lowered into the interior of a sectional well casing 12. The actuator assembly 10 includes a housing 13 having an axial cylindrical bore 14 which is closed at both ends. A weighted free piston 15 is mounted to slide within the bore 14. The actuator assembly 10 also includes a rod 16 fixed to the lower end of the housing 13 and connected to the mandrel 17 of the bridge plug assembly generally designated 18. An inertia weight 19 has a central clearance opening 20 through which the rod 16 extends. The weight 19 is supported by means of the sleeve 21 on the ring 22 which forms a part of the bridge plug assembly 18. The ring 22 is mounted to slide relative to the mandrel 17. In the general plan of operation the weighted piston 15 is initially maintained at the upper end of the cylindrical bore 14 by means of compressed air or other gas in the chamber 23 below the piston 15. A powder charge 24 within the housing 13 and communicating with the bore 14 above the weighted piston 15 is fired by means of the igniter 25 and electrical lead wire 26 which is carried within the supporting wire line 11. When the powder charge 24 is thus exploded, the weighted piston 15 moves downward and the housing 13 moves upward. The relative masses of the weighted piston 15 and the housing 13 with attached rod 16 are such that the housing 13 and rod 16 move upward rapidly to a considerable extent before the weighted piston 15 reaches the lower end 27 of the chamber 23. The compressed air within the chamber 23 is further compressed by the relative axial movement of the piston 15 and housing 13 and serves to cushion the contact between the lower end of the piston 15 and the lower end 27 of the chamber 23.

The rod 16 has a releasable connection 29 with the mandrel 17, as described below. The upward movement of the rod 16 pulls the mandrel 17 upward with respect to the ring 22, because the inertia weight 19 acting through the sleeve 21 prevents rapid upward movement of the ring 22. Consequently, upward movement of the mandrel cap 30 causes the slip expanders 31 and 32 to expand the slips 33 and 34 respectively into engagement with the inner surface of the well casing 12, and at the same time to expand the annular rubber packer 35 into sealing engagement with the well casing 12.

Figure 2:
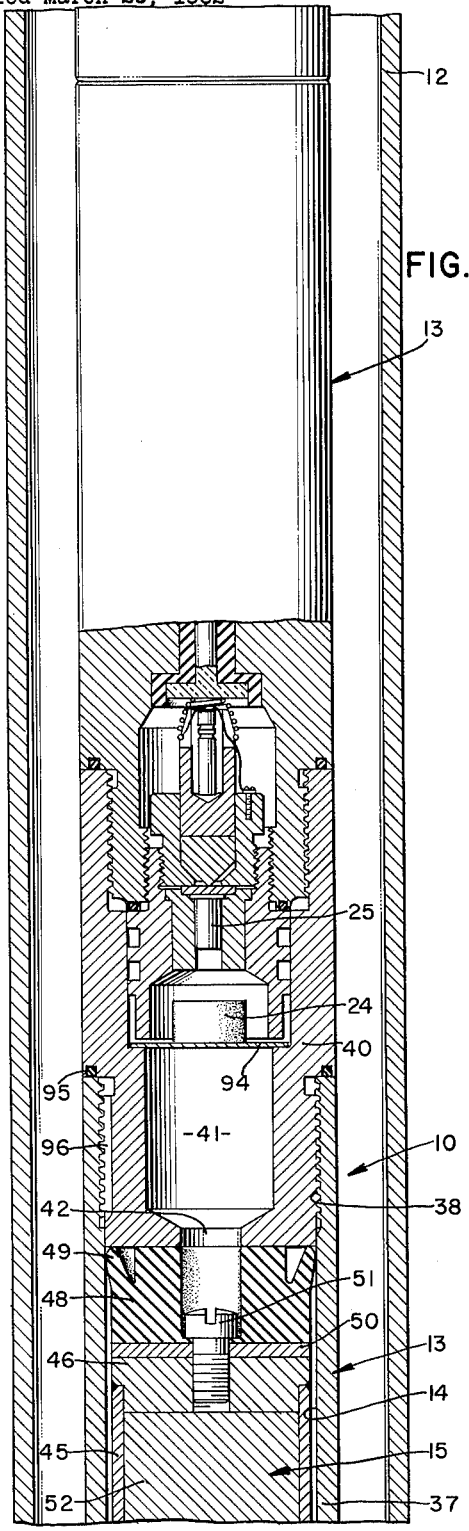
FIGURE 2 is a longitudinal sectional view of the upper portion of the device of FIGURE 1.

Proceeding to a more detailed description of a particular mechanical construction for carrying out this invention, as shown in FIGURES 2–14, the electrical assembly shown in the upper half of FIGURE 2 is conventional. The housing 13 of the actuator 10 includes the barrel 37 having a cylindrical bore 14 and having threads 38 at its upper end and threads 39 at its lower end. The housing 13 also includes the body part 40 connected with the threads 38 and having a central cavity 41 communicating with the bore 14 through the central aperture 42. The lower end of the bore 14 is closed by the plug 43 attached to threads 39.

The free piston 15 comprises a shell 45 welded to an upper head 46 and a lower head 47. Sealing means are provided on opposite ends of the free piston 15 for forming a sliding seal with the cylindrical bore 14, and as shown in the drawings, the sealing means each comprise a massive block 48 of resilient rubber material provided with a peripheral sealing lip 49, a bronze or other metal plate 50 is interposed between the rubber block 48 and the respective piston heads 46 and 47 and is preferably of such a diameter or has such peripheral form as to centralize the piston in the bore 14 and thereby assure better sealing action and preclude deformation of the rubber material when the tool is idle and rests on its side. A threaded fastening 51 passing through a central aperture in the plate 50 serves to hold each seal block 48 to its respective piston head 46, 47. The piston parts 45, 46 and 47 are preferably formed of steel and the central portion is preferably filled with lead or other heavy material 52, such as "heavy metal."

Figure 3:
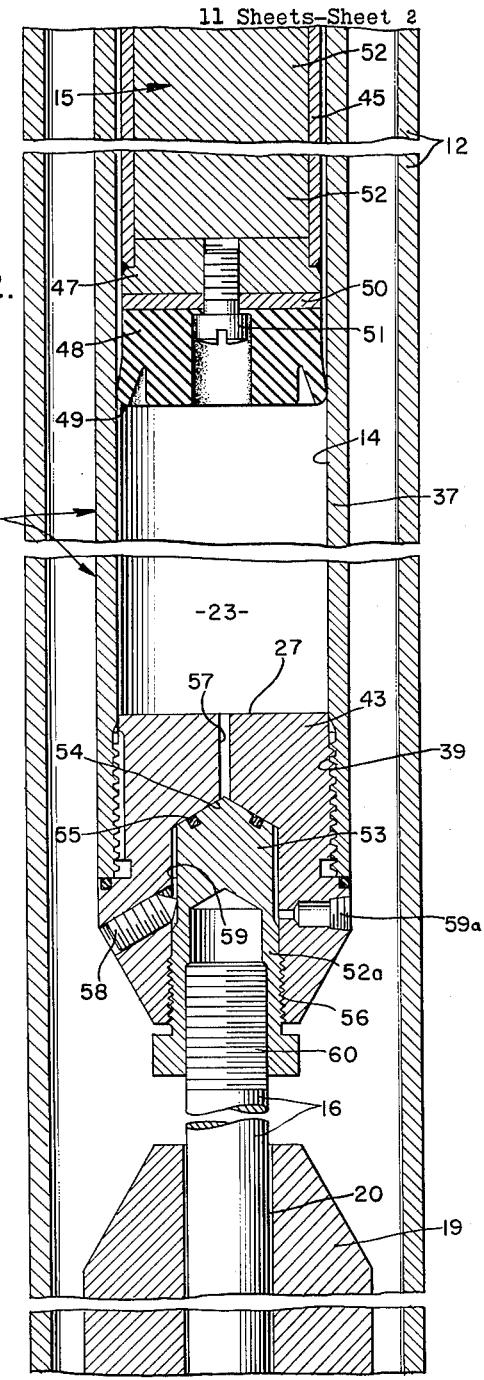
FIGURE 3 is a sectional view comprising a continuation of the lower end of FIGURE 2.
Figure 8:
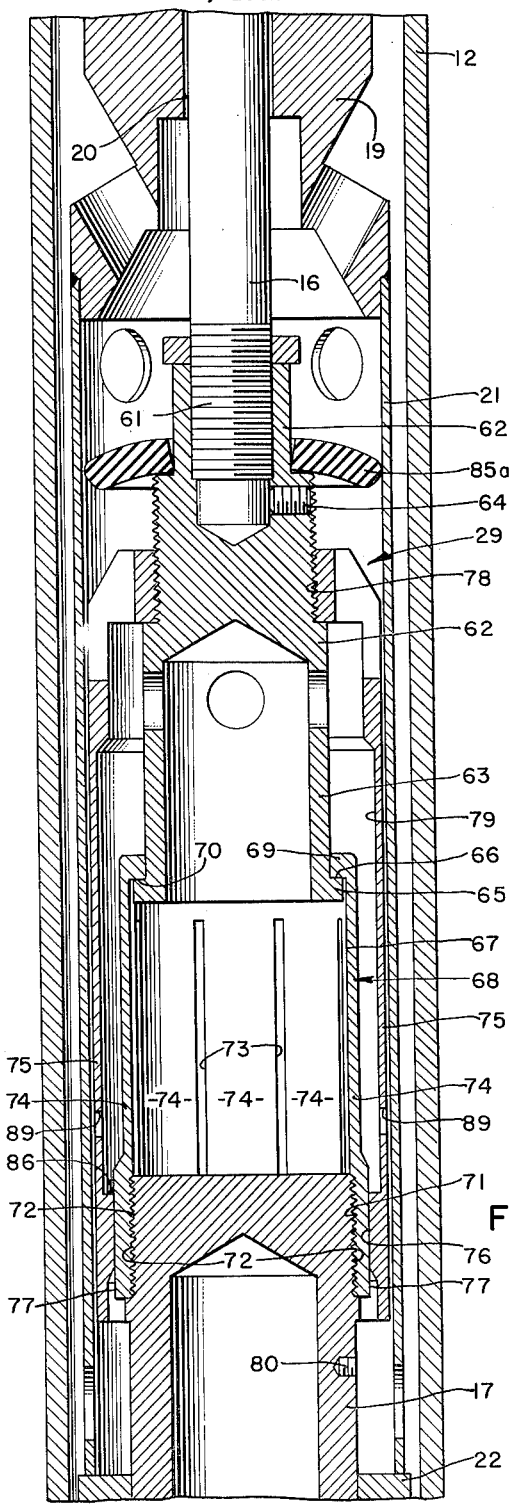
FIGURE 8 is a sectional view similar to FIGURE 4 but showing the parts in a different position.
Figure 9:
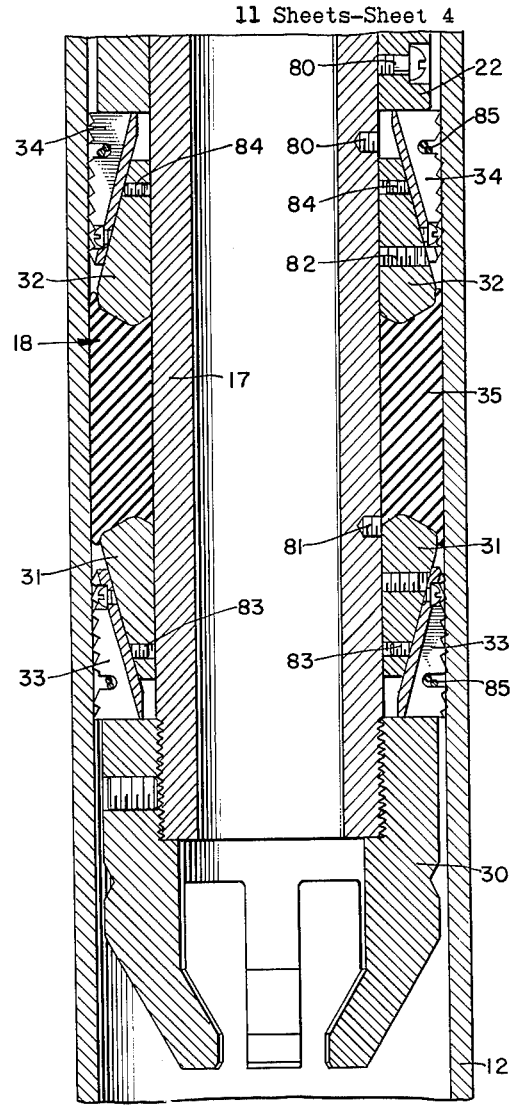
FIGURE 9 is a sectional view comprising a continuation of the lower end of FIGURE 8.
Figure 14:
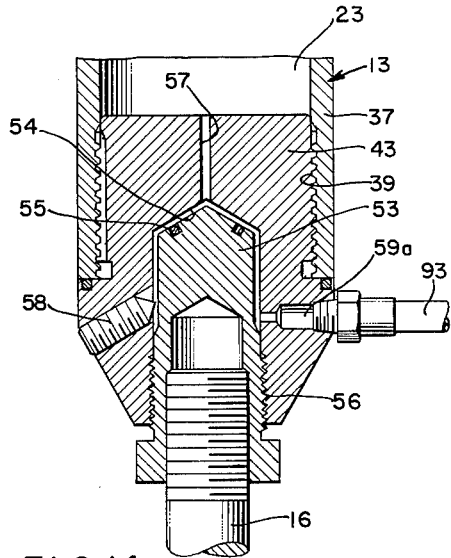
FIGURE 14 is a sectional detail showing the manner of introducing air under pressure into the lower end of the cylindrical bore below the free piston.

Means are provided for initially maintaining the weighted piston 15 at the upper end of the bore 14. As shown in FIGURES 3, 10 and 14 of the drawings, a threaded bushing 52a is provided with a valve head 53 at its upper end shaped to seal against the seat surface 54 provided within the plug 43. A seal ring 55 prevents leakage between the parts 52a and 43. When the bushing 52a is turned along the threads 56 to seat the parts 53 and 54 the passageway 57 is closed. Turning movement of the bushing 52a with respect to the plug 43 may be prevented by means of set screw 58 engaging within one or more axial channels 59 provided on the outer surface of the bushing 52a. Release of the set screw 58 and turning movement of the bushing 52a along the threads 56 permit separation of the parts 53 and 54 as shown in FIGURE 14, and allows compressed air or gas to be introduced through the inlet 59a into the chamber 23 via the passageway 57.

The upper end of the rod 16 is connected by threads 60 to the bushing 52a and the lower end is connected by threads 61 to the connector 62 which is formed integrally with the upper end of the tension sleeve 63. The connector 62 and tension sleeve 63 comprise a part of the mechanism forming the releasable connection 29 to the bridge plug generally designated 18. The lower end of the sleeve 63 is provided with an end flange 65 having an annular upward facing shoulder 66. The sleeve 63 and flange 65 are telescopically mounted within the bore 67 of the connector shell member 68. The upper end of this shell member 68 is provided with an end flange 69 having a downward facing shoulder 70 overlying the shoulder 66.

The connection between the tension sleeve 63 and the shell member 68 is one which may be described as an axial lost-motion connection. The lower end of the shell member 68 is provided with internal ribs or if preferred threads 71 which engage external ribs or threads 72 provided on the upper end of the bridge plug mandrel 17. A plurality of axial slots 73 extend through the wall thickness of the shell member 68 from the lower end thereof and terminate near the upper end thereof, thus separating the major portion of the length of the shell member 68 into a plurality of separate fingers 74 joined together in an integral fashion at their upper ends.

A compression member 75 has an internal cylindrical surface 76 which engages the outer cylindrical surface 77 on each of the fingers 74, and thus serves to hold the ribs or threads 71 of the fingers in tight engagement with the external ribs or threads 72 on the upper end of the mandrel 17. This tubular member 75 is fixed at its upper end to the connector 62 by means of the threads 78. The counterbore 79 of the member 75 is of larger diameter than the cylindrical bore 76 so that when the tubular member 75 has moved downward with respect to the mandrel from the position shown in FIGURE 8 to the position shown in FIGURE 11, the fingers 74 are free to spring outward to clear the ribs or threads 71 from the ribs or threads 72 and thereby release the mandrel 17 from the tension sleeve 63 and rod 16. The parts are proportioned, however, so that this release does not occur until the mandrel 17 has moved to the upper end of its stroke to set the slips 33 and 34 as well as to expand the rubber packing element 35 into contact with the casing 12. Upon subsequent downward movement of the rod 16 under recoil action of the actuator housing 13, the lower end of the tubular compression member 75 strikes a hammer blow on the ring 22 to further set the top slips 34 of the bridge plug assembly 18. A rubber disk 85a encircles the connector 62 and engages the inner surface of the sleeve 21 to exclude sand from the working parts of the releasable connection 29.

As shown in FIGURE 5 the bridge plug assembly 18 is provided with a plurality of frangible elements which serve initially to maintain the parts of the assembly in retracted position, in order to prevent premature setting of the bridge plug as it is lowered through the casing 12 to the desired position within the well. Thus the ring 22 may be provided with shear screws 80 connecting it to the mandrel 17, and the slip expanders 31 and 32 may likewise be connected to the mandrel 17 through the shear screws 81 and 82, respectively. The slips 33 may be connected by shear screws 83 to the expanders 31, and similarly the slips 34 may be connected to the expander 32 by means of shear screws 84. When the mandrel moves upward suddenly with respect to the ring 22, the shear screws 80 are broken and as the mandrel 17 continues to move upward all of the other shear screws are broken. Circumferential wires 85 which serve initially to hold the slips in retracted position are broken as the slips move outward along the inclined expander cones. During the upward movement of the mandrel 17 the bridge plug parts move from the retracted position shown in FIGURE 5 to the "set" position shown in FIGURE 9.

During all of this upward movement of the mandrel 17, the shoulders 66 and 70 of the tension sleeve 63 and shell member 68 remain in contact. Sudden reversal in the direction of travel of the rod 16 and tension sleeve 63 under recoil however, serves to move the parts 63 and 75 downward with respect to the shell member 68. This action results in release of the fingers 74 and permits them to spring outward to the position shown in FIGURE 11. In position of the parts shown in FIGURE 11 the extreme lower ends of the finger 74 overlie the shoulder 86 on the tubular member 75, and hence the fingers 74 are not returned into threaded engagement with the mandrel 17, even though the tension sleeve 63 subsequently moves upward to bring the shoulders 66 and 70 into engagement.

Figure 12:
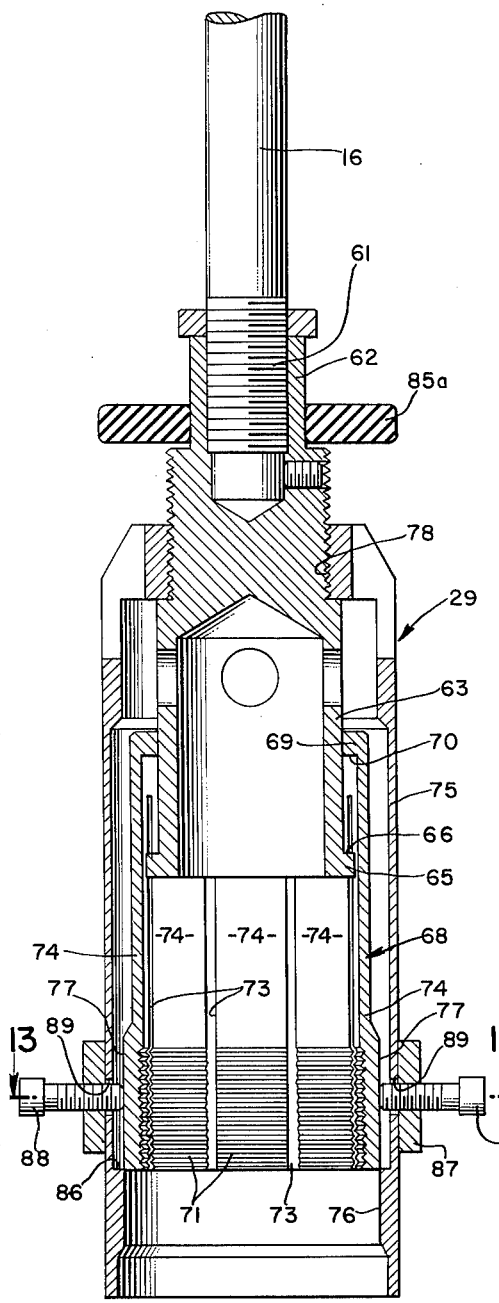
FIGURE 12 is a sectional view of an assembly tool for use with the apparatus shown in FIGURES 4, 8, and 11.
Figure 13:
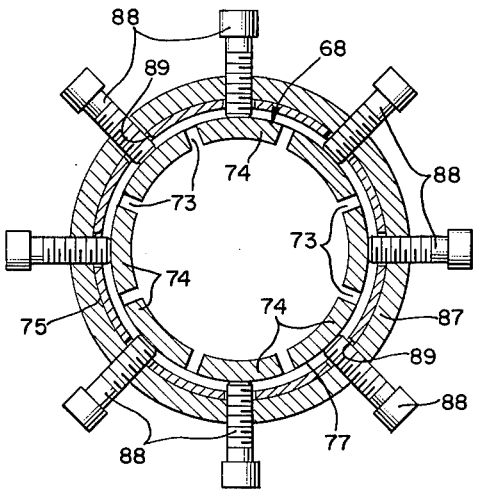
FIGURE 13 is a transverse sectional detail taken substantially on the lines 13—13 as shown in FIGURE 12.

FIGURES 12 and 13 show an assembly tool for use in enabling relative longitudinal movement of the portion 77 of fingers 74 past the shoulder 86 and into the reduced diameter cylindrical surface 76. This tool comprises the ring 87 having a plurality of internal wrenching set screws 88 positioned around its periphery and each threaded for radial movement with respect thereto. At the time of assembly of the connector device to the bridge plug assembly 18 when the fingers 74 have ribs 72 as distinguished from threads, the tool is placed in position as shown in FIGURE 12 with the ring encircling the compression member 75 and with the cap screws 88 each extending through an aperture 89 formed in the compression member 75. The inner end of each of the screws 88 contacts the outer surface 77 of one of the fingers 74, respectively. The screws 88 are turned to spring the fingers 74 inward and to bring the internal ribbed portions 71 thereof into engagement with the external ribs 72 on the upper end of the mandrel 17. The mandrel 17 and fingers 74 and shell member 68 are then moved axially in a direction to bring the outer surfaces 77 of the finger 74 into the cylindrical bore 76 within the compression sleeve 75. The screws 88 are then turned and withdrawn from the apertures 89 and the ring 87 is moved upward along the member 75 and removed over the end of the rod 16. If the fingers 74 have threads engageable with complemental threads on the mandrel 17, it will be appreciated that the plug may be threaded into the releasable connection which has been conditioned by means of the just described tool.

Figure 15:
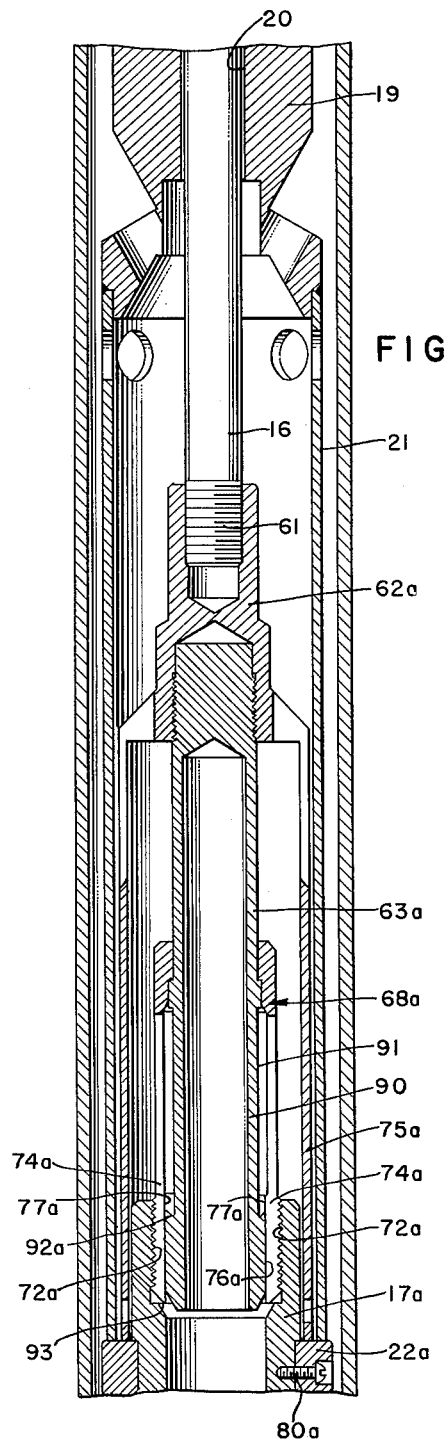
FIGURE 15 is a sectional view similar to FIGURE 4 showing a modified form of a setting and releasing device for a bridge plug.
Figure 16:
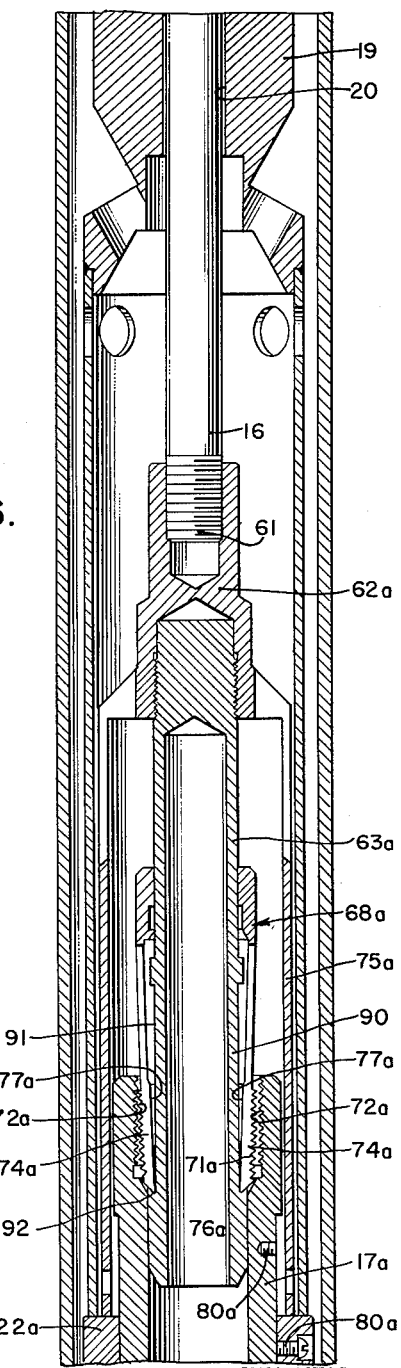
FIGURE 16 is a sectional view similar to FIGURE 15 showing the parts in a different position.

In the modified form of the releasable connection shown in FIGURES 15 and 16 the fingers 74a are expanded into engagement with the internal threads or ribs 72a provided within the upper end of the mandrel 17a. The fingers 74a are formed on the shell member 68a which has an axial lost-motion connection with the tension sleeve 63a. The back-up member 90 having the cylindrical surface 76a is formed on the lower portion of the tension sleeve 63a, and the surface 76a engages the internal cylindrical surface 77a defined by the fingers 74a. The tubular compression member 75a is formed integrally with the lower portion of the connector 62a. The rod 16 is connected by threads 61 to the connector and the rod extends loosely through the opening 20 in the weight member 19 supported on the ring 22a by the sleeve 21, as described in connection with the preferred form of the invention.

When the rod 16 moves up suddenly under the force applied by the actuator assembly 10, the pins 80a in the ring 22a are sheared and the tension sleeve 63a moves the shell member 68a upward from the position shown in FIGURE 15 to the position shown in FIGURE 16. Subsequent downward movement of the rod 16 and tension sleeve 63a under recoil action of the actuator assembly 10 moves the back-up member 90 downward with respect to the mandrel 17a so that the cylindrical surface 76a moves downward and out of the contact with the spring fingers 74a. The cylindrical surface 91 of the back-up member 90 is of smaller diameter than the cylindrical surface 76a so that the fingers 74a move inward and out of contact with the internal ribs or threads 72a on the mandrel 17a. An inclined shoulder 92a on the back-up member 90 between the cylindrical surfaces 76a and 91 serves to engage the tapered lower ends 93 on the fingers 74a, and thereby maintain the fingers in retracted position.

In operation, the chamber 23 below the weighted free piston 15 is charged with compressed air or other gas by means of the conduit 93 and inlet 59a shown in FIGURE 14 and the bushing 52a is in turn to close the head 53 against the seat 54. The set screw 58 is turned to prevent unscrewing movement of the bushing 53. The space within the sleeve 21 and below the rubber disk 85a is filled with oil. The entire device including the actuator 10, rod 16, weight 19 and sleeve 21, and bridge plug assembly 18 is suspended on a wire line 11 and lowered into a well casing 12 to the desired position.

Electrical energy from the surface delivered through wire 26 fires the igniter 25 and this in turn fires the powder charge 24 resting on the frangible support disk 94. The explosion and rapidly expanding gases in the firing chamber 41 exert sudden and tremendous pressure through the opening 42 onto the upper end of the weighted piston 15. The explosive force not only applies downward against the piston 15 but upward against the head 40 and housing 13. The weighted piston 15 moves downward, further compressing the air within the chamber 23, and the housing moves upward pulling the rod 16 with it. The extent of movement is not great enough to cause tangling of the wire line 11 within the casing 12. The sudden upward force applied by the rod 16 through the releasable connection 29 sets the slips 33 and 34 and expands the central packing element 35 on the bridge plug assembly 18 into contact with the casing 12. The weight 19 acting through the sleeve 21 prevents upward movement of the bridge plug ring 22 during the latter action. The recoil or reversal of direction of movement of the weighted piston 15 and the housing 13 moves the rod 16 downward and thereby disconnects the fingers 74 or 74a from the upper portion of the mandrel 17. In effect this disconnects the actuator 10 from the bridge plug assembly 18. The same downward movement of the rod 16 which effects this disconnection also serves to apply a hammer blow to the bridge plug ring 22 through the tubular compression member 75 or 75a thereby insuring seating of the slips 34. At this point in the cycle of operations the bridge plug assembly 18 is "set" and is released from the rod 16. The entire device with the exception of the bridge plug assembly 18 may then be removed vertically on the wire line 11.

The high pressure gases remaining within the bore 14 above the piston 15 may be allowed to escape by turning the barrel 13 with respect to the head 40 along the threads 38 to cause the seal ring 95 to move away from the end of the barrel 37. The high pressure within the bore 14 and above the piston 15 escapes through groove 96 formed in the head 40. The compressed air within the chamber 23 below the piston 15 may be allowed to escape by removing the plug 43 from the lower end of the barrel 37 or by turning of the bushing 53 with respect to the plug 43. The piston may then be removed from the barrel and the barrel cleaned prior to the next use of the actuator.

The work device diagrammatically shown in FIGURES 17, 18, and 19 operates to punch a lateral hole in the wall of the casing 12 and the device is powered by the actuator shown in FIGURE 27. The perforator device generally designated 101 is shown diagrammatically in the drawings and includes a body 102 fixed to the lower end of the actuator housing 103. The weighted piston, not shown, is mounted to slide within the cylindrical bore 104 of the housing 103. The body 102 has a central downward projecting bar 105 fixed thereto and this bar is encircled by a weight 106 mounted within the casing 12. The weight 106 has an upward projecting part 107 which is slidably mounted along one side of the body 102. The projection 107 is provided with an aperture 108.

A perforator tool 109 is provided with trunnions 110 which are mounted to turn relative to the body 102. The projecting nose 111 of the tool 109 extends through the aperture 108. A central slot 112 is provided in the body 102 to provide the clearance for a swinging movement of the perforator tool 109.

The lower end of the bar 105 is connected by threads 114 to the collar 115. A coil spring 116 encircles the bar 105 and its lower ends rest on the collar 115. The spring 116 extends through the bore 117 of the weight member 106 and the upper end of the spring 116 engages the shoulder 118. The weight member 106 and its upward projection 107 are thus supported by means of the spring 116, and the force of the spring is sufficient to hold the upper end of the projection 107 initially in contact with the shoulder 119 on the body 102.

An axial rod 120 is threadedly connected at 121 to the collar 115 and this rod extends loosely through the bore 122 of the slip support member 123. A nut 124 on the lower end of the rod 120 engages the shoulder 125 on the member 123 and is held in that position by means of the compression spring 126 which encircles the rod 120 and which extends between the member 123 and the collar 115.

A plurality of wedge slips 127 each provided with a serrated face 128 is mounted on the member 123 by means of a tongue-and-groove connection 129. The conical surface 130 on the collar 115 engages the complementary tapered surface 131 on each of the wedge slips 127. From this description it will be understood that when the collar 115 moves downward with respect to the member 123, the wedge slips 127 each move radially outward into contact with the interior of the casing 12 to the position shown in FIGURE 19.

In operation, the parts are initially in the position shown in FIGURE 17. When the actuator is energized by firing the powder charge 24a, the housing 103 moves upward suddenly with respect to the weighted free piston 15a, thereby moving the body 102 and bar 105 and collar 115 to the position shown in FIGURE 18. The inertia effect of the weight 106 holds it in substantially the same position. The upward travel of the body 102 with respect to the weight member 106 and its projection 107 causes the nose 111 of the perforation tool 109 to form an aperture 132 in the casing 12. The downward return movement of the housing 103 and body 102 does not, however, return the perforation tool 109 to its initial position, but on the contrary, the downward movement of the body 102 with respect to the weight member 106 and its upward projection 107 is arrested before the perforation tool 109 has moved far enough to become stuck in the perforation 132. Arresting of the downward motion of the body 102 is accomplished by the slips 127 as they move into engagement with the interior of the casing 12. After the parts have reached the position shown in FIGURE 19, the work device 101 and the actuator may be withdrawn upward from the hole as a unit by means of the wire line.

In the work device shown diagrammatically in FIGURES 20–24, apparatus is provided for applying sudden axial loads or sudden torque loads to a pipe 150 within the well bore. This pipe may comprise the casing 12 or may comprise drill pipe or tubing. The device is powered by the actuator shown in FIGURE 27. The housing 103 of the actuator device is fixed at its lower end to a mandrel 152 which takes the form of a cylindrical bar having steep-pitch helical thread elements 153 near its upper end. The central portion of the bar 152 passes loosely through the bore 154 of the weight member 155 and the lower end of the bar 152 is secured by threads 156 to the expander collar 157. A first wedge slip assembly generally designated 158 is positioned between the weight member 155 and the expander collar 157. Similarly, a second wedge slip assembly 159 is positioned between the weight member 155 and the collar 160. The collar 160 is provided with internal steep-pitch helix threads 161 which cooperate with the external threads 153 formed on the mandrel 152. Shear pins 162 are provided to prevent relative movement of the collar 160 with respect to the mandrel 152. A segmental filler ring 163 encircles the extreme upper end of the mandrel 152 and is interposed between the collar 160 and the shoulder 164. This segmental filler ring 163 is held in position by means of the threaded fastening 165. A downward extending lug 166 on the filler ring 163 projects into a radial slot 167 on the collar 160 to prevent relative turning movement. When the filler ring 163 is in place as shown in FIGURES 20, 21, and 22, the collar 160 functions as an integral part of the mandrel 152.

The outer surface of the collar 160 is provided with a plurality of tapering flat sides 168 for sliding reception of the tapered back faces 169 formed on each of the wedge slips 170. Each of the wedge slips 170 is provided with a serrated surface 171 for engagement with the inner surface of the pipe 150.

Each wedge slip is mounted upon a spring finger 172. The spring fingers 172 are carried on a common support ring 173 mounted to turn on the weight member 155. A lip 174 on the support ring 173 enters a circumferential groove 175 on the weight member 155 to prevent relative axial movement of the slip assembly 159 and weight member 155. Similarly, the wedge slips 177 in the slip assembly 158 are each provided with a serrated face 178 and each is mounted on a spring finger 179 carried on a common support ring 180. This support ring is mounted to turn relative to the weight member 155 and has a lip 181 engaging within the circumferential groove 182 to prevent relative axial movement of the slip assembly 158 with respect to the weight member 155.

When it is desired to apply a jarring blow axially to the pipe 150, the pipe may be first placed under tension from the surface and the actuator is then energized to cause sudden upward movement of the housing 103. This causes the mandrel 152 and the expander collar 157 to move upward very rapidly. The inertia of the weight member 155 serves to hold it in its original position, with the result that the wedge slips 177 on the lower wedge slip assembly 158 are moved outward into contact with the interior of the pipe 150. On the completion of the upstroke of the housing 103, the parts are in the position shown in FIGURE 21. The wedge slips 170 in the wedge slip assembly 159 remain in retracted position, the spring fingers 172 frictionally gripping the mandrel 152 on the return downward stroke of the actuator housing 103, the flat tapered faces 168 on the collar 160 engage the flat inclined faces 169 on the wedge slips 170 and expand the wedge slips 170 into contact with the inner surface of the pipe 150. The slip assemblies 158 and 159 and the weight member 155 do not move downward because of the inertia effect of the weight member 155.

From the above description it will be understood that engagement of the slips 177 in the lower wedge slip assembly 158 produces a sharp upward force on the pipe 150, and subsequent engagement of the wedge slips 170 in the upper slip assembly 159 applies a very sharp downward force to the well pipe 150. The entire device may be removed from the interior of the pipe 150 on a wire line, and upward movement of the device serves to release the upper wedge slips 170.

When it is desired to use the work device of FIGURES 20–24 to apply a sudden torque load to the casing or to other well pipe, the spacer ring 163 is withdrawn from the device before the device is inserted into the well pipe. The shear pins 162 prevent relative movement of the collar 160 and mandrel 152 until the actuator is energized. Upon sudden upward movement of the actuator housing 103, the slips 177 engage the interior of well pipe 150 as described above. Downward movement of the housing 103, which immediately follows, drives the upper wedge slips 170 into engagement with the interior of the well pipe 150 and also shears the pins 162 and causes the collar 160 to turn relative to the mandrel 152. The flat engaging faces 168 and 169 on the collar and wedge slips cause the wedge slips to turn about the central axis of the mandrel 152 and apply a torque load to the inner surface of the pipe 150. The upper slip assembly 159 is permitted to turn with respect to the weight member 155 by reason of its rotary mounting.

If desired, the device of FIGURES 20–24 may be employed to "back off" or unscrew a threaded connection in the sectional drill pipe. In such case, a torque load is initially applied to the drill pipe at the surface and additional torque load is applied by means of the work device just above the joint to be unscrewed. The sudden addition of torque load as applied by the wedge slips 170 serves to disconnect the adjacent threaded joint. It will be observed in FIGURE 24 that the serrated faces 171 of the upper wedge slips 170 are constructed so as to be capable of applying a torque load to the inner surface of the well pipe 150.

The modified form of work device shown in FIGURE 25 has a central mandrel 180a connected to the housing of the actuator device. The lower end of the mandrel is connected by threads 181a to the tapered expander 182a. The weight member 183 is connected at its upper end to the lower portion of a swage assembly 184, which comprises a tubular member having a plurality of axial slots 185. In the device shown in FIGURE 25, eight slots 185 are provided. The lower end of the swage device 184 comprises a ring 186 having a shoulder 187, positioned to be engaged by the lower end 188 of the central post 189 formed on the expander 182a. The upper end of the tubular member is connected by threads 190 to the guide collar 191, which is loosely mounted on the mandrel 180a. The upper portion of the tubular member 184 is generally cylindrical, while the lower portion of said member is frusto-conical. The cylindrical portion has running clearance within a casing having normal internal dimensions, but a tight spot in the casing will prevent free passage of the swage assembly.

In operation, the device is lowered into the interior of the casing on a wire line and is attached to the lower end of the actuator device. The actuator device is similar to that previously described, except that the powder charge is ignited below the weighted piston instead of above it, with the result that the housing initially moves downward and subsequently moves upward. The assembly is lowered through the interior of the casing until a tight spot is encountered, thereby arresting further downward movement of the assembly. The actuator device is then energized, causing sudden downward movement of the mandrel 180a. This action forces the expander 182a to move downward with respect to the cage 184 and causes the lower end 188 of the post 189 to strike a sharp blow on the shoulder 187. The upward movement of the mandrel 180, which occurs immediately afterward, serves to withdraw the expander 182a in an upward direction, thereby freeing the tapered outer surface 192 from the tapered internal wall of the cage 184. The large apertures 193 and 194 in the expander 182a and guide collar 191 permit free flow of well fluid during the downstroke and upstroke of the mandrel 180a.

In the modified form of work device shown in FIGURE 26, a junk bailer device is provided for operation by means of the actuator device shown in FIGURE 1. The cylindrical body 200 of the bailer device is open at the bottom and is provided with a plurality of upwardly directed and inwardly extending leaf spring members 201. These members are constructed so that they deflect to permit entry of "junk" 202 into the cavity 203, but return to central position to prevent the junk from dropping out of the bottom end of the bailer body 200. A cylindrical liner 204 is mounted within the body 200 and a piston 205 slides within the bore 206 of this liner. A piston rod 207 is connected to the piston 205 and this rod 207 is threadedly connected to the lower end of the housing of the actuator device 10 in place of the rod 16. Sudden upward movement of the housing and piston rod 207 reduces the well fluid pressure within the cavity 203 in the lower end of the junk bailer body 200, with the result that the bailer body is forced downward over the junk 202 in the bottom of the hole, and the junk is then trapped within the cavity 203 above the spring members 201 which return to central position. The following downward stroke of the piston 205 does not force the junk out of the cavity 203 because the spring members 201 prevent it.

Having fully described my invention, it is to be understood that I am not to be limited to the details herein set forth, but that my invention is of the full scope of the appended claims.

I claim:

1. An actuator, comprising in combination: a housing member having a closed passage therein, a free piston member slidably disposed in and movable along said passage, means on the piston member forming a sliding seal with said passage, means including an explosive charge within said housing member communicating with the passage for effecting movement of said housing member, said passage remaining closed during the full extent of said movement, and means whereby such movement of the housing member may drive a work element.

2. An actuator, comprising in combination: a housing member having a closed chamber therein, a free piston member disposed in and movable along said chamber, and energy-releasing means within said housing member communicating with said chamber for effecting movement of said housing member, said chamber remaining closed during the full extent of said movement, and means whereby such movement of the housing member may drive a work element.

3. For use with a work device having a first part axially movable with respect to a second part, an actuator having in combination: an upright tubular housing and having an axially extending closed bore therein, a free piston slidably mounted in said bore, means including energy releasing means within said housing for moving the housing axially relative to said piston, a projecting element fixed to the housing, said projecting element having means for connecting said projecting element to one part of the work device, and a weight member relatively movably encircling said projecting element to act against the other part of the work device upon movement of said housing and said projecting element relative to said weight member.

4. For use with a bridge plug having a mandrel axially movable with respect to a ring, an actuator having in combination: an upright tubular housing provided with an axially extending closed bore therein, a free piston slidably mounted in said bore, means including energy-releasing means within said housing for moving the housing axially relative to said piston, a rod attached for movement with said housing, said rod having means for connecting said rod to the mandrel, and a weight member relatively movably encircling said rod to act against the ring upon movement of said housing and said rod relative to said weight member.

5. In a device for setting a tool in a well, the tool having a movable part, the combination of: an actuator having a housing provided with a closed bore, a free piston mounted to slide in the bore, means including energy-releasing means within the housing for effecting axial movement of said housing relative to said piston, means including a releasable connection device for connecting the movable part for movement with said housing, said releasable connection device embodying means whereby reverse movement of the housing serves to disconnect it from the movable part.

6. In a device for setting a bridge plug in a well casing, the bridge plug having a central mandrel, the combination of: an actuator having an upright tubular housing provided with a longitudinal closed bore, a free piston mounted to slide in the bore, means including an explosive charge for effecting movement of the housing relative to said piston, means including a releasable connection device connecting the mandrel for axial movement with said housing in one direction, said releasable connection device having means whereby reverse axial movement of the housing serves to disconnect it from the mandrel.

7. In a device for setting a bridge plug in a well casing, the bridge plug having a central mandrel, the combination of: an actuator having an upright tubular housing provided with a longitudinal closed bore, a free piston mounted to slide in the bore, means including an explosive charge for effecting upward movement of the housing relative to said piston, means including a releasable connection device for connecting the mandrel for upward movement with said housing, said releasable connection device having means including an axial lost-motion connection whereby downward movement of the housing serves to disconnect it from the mandrel.

8. In a device for setting a bridge plug in a well casing, the bridge plug having a central mandrel, the combination of: an actuator having an upright tubular housing provided with a longitudinal closed bore, a free piston mounted to slide in the bore, means including an explosive charge for effecting upward movement of said housing relative to said piston, a rod secured to said housing, a releasable connection device for connecting the mandrel for upward movement with said rod, said releasable connection device including a tension sleeve fixed relative to the rod and a shell member releasably attached to the mandrel, said tension sleeve and said shell member having an axial lost-motion connection, and means whereby downward movement of the rod serves to disconnect the shell member from the mandrel.

9. In a device for setting a bridge plug in a well casing, the bridge plug having a ring and a central mandrel movable with respect to the ring, the combination of: an actuator having an upright tubular housing provided with a longitudinal closed bore, a free piston mounted to slide in the bore, means including an explosive charge for effecting upward movement of said housing relative to said piston, means including a releasable connection device for connecting the mandrel to said housing for upward movement with said housing, said releasable connection device having means whereby downward movement of the housing serves to disconnect it from the mandrel, and means including a compression sleeve secured to said device for movement with said housing and adapted to engage the ring of the bridge plug upon said downward movement of the housing.

10. In an actuator, the combination of: a housing member having a closed axial bore, a free piston slidably mounted to move along said axial bore, means including an explosive charge within said housing communicating with the bore for effecting axial movement of said housing relative to said piston, the housing having a member thereon defining the lower end of said bore, said member having an axial opening provided with a seat and having a passageway communicating between said opening and said bore, a fluid inlet on said member communicating with said opening, a bushing mounted on said member and having a valve head adapted to contact the seat to close the passageway, said bushing being movable with respect to said member to move the valve head away from the seat to establish communication between said fluid inlet and said passageway.

11. An actuator for a well tool having a pair of relatively longitudinally movable parts and means operable by such movement of said parts, comprising: an actuator body, means at an end of said body for connection of said body to one of said tool parts, an inertia weight, said weight having means engageable with the other of said tool parts, and means for effecting abrupt movement of said body relative to said weight to cause longitudinal movement of said one of said tool parts while said weight holds said other of said tool parts relatively stationary, the latter said means comprising a free body movable longitudinally relative to said actuator body, means for holding said free body in a first position relative to said actuator body, and means for abruptly biasing said actuator body and said free body relative longitudinally to cause movement of said actuator body relative to said weight.

12. In a device adapted to be lowered into a well bore on a wire line, a combination of: a tubular housing, a weighted free piston adapted for relative axial movement within the housing, a powder charge at one end of the weighted piston for effecting relative axial movement of said tubular housing with respect to said weighted piston, a work device having a first member fixed relative to said housing for axial movement therewith, an inertia weight, the work device having a second member connected to said inertia weight, and a work performing element on said work device operated by relative axial movement of said members.

13. The device as set forth in claim 12 in which said work performing element comprises a perforator finger mounted to turn on one of said members and adapted to form a lateral aperture in an encircling well pipe.

14. A combination set forth in claim 12 in which the work element comprises a wedge slip adapted to be expanded into contact with the interior of the well casing.

15. A combination set forth in claim 12 wherein the work element comprises a wedge slip, and wherein an expander ring engageable with said wedge slip is mounted for helical movement relative to the first said member, whereby said wedge slip may be expanded into contact with the interior of an encircling well pipe to impart a torque load to said well pipe.

16. In a device adapted to be lowered into a well bore on a wire line, a combination of: a tubular housing, a weighted free piston adapted for relative axial movement within the housing, a powder charge at one end of the weighted piston for effecting upward movement of said tubular housing with respect to said weighted piston, a work device having a first member fixed relative to said housing for upward movement therewith, said work device having a second member comprising a tubular body open at its lower end, inclined spring members at said open lower end of the body to permit entry of junk into the interior of the body, but to prevent escape of junk therefrom, the body having an axial bore, and said first member including a piston slidable in said bore.

17. In a device adapted to be lowered into a well bore on a wire line, a combination of: a tubular housing, a weighted free piston adapted for relative axial movement within the housing, a powder charge at one end of the weighted piston for effecting relative axial movement of said tubular housing with respect to said weighted piston, a work device having a first member fixed relative to said housing for axial movement therewith, an inertia weight, the work device having a second member connected to said inertia weight, said second member comprising a cage having a tapered lower portion being adapted to encounter a tight spot in a casing, the first member including an expander ring within said cage and having a tapered outer surface adapted to expand the tapered portion of the cage to enlarge the tight spot in the casing.

18. An actuator comprising in combination: a housing member with a closed chamber, a passage in said chamber, a free piston member movably disposed in said passage, means for relatively positioning said piston member in a first position relative to said housing member, pressure-developing means within said housing in communication with said passage and selectively operable for providing pressure within said housing member and effecting movement of said housing member relative to said piston member from said first position, said chamber remaining closed during the full extent of said movement, and means whereby such movement of said housing member may drive a work element.

19. The apparatus of claim 18 wherein said positioning means has energy-restoring properties to provide a recoil of said housing member relative to said piston member after movement from said first position.

20. An actuator comprising in combination: a housing member with a closed chamber, a passage in said chamber, a free piston member movably disposed in and relative to said passage and separating said chamber into first and second volumetric portions, means for relatively positioning said piston member in a first position relative to said housing member comprising gas under pressure in one of said portions, selectively operable means for developing gas pressure within the other of said portions in communication with said passage for effecting movement of said housing member relative to said piston member initially in a first direction whereby said housing member has a reciprocating motion relative to said piston member, and means whereby such motion of said housing member may drive a work element.

References Cited by the Examiner

UNITED STATES PATENTS

| | | | |
|---|---|---|---|
| 1,162,601 | 11/1915 | Graham | 166—55.3 |
| 1,461,460 | 7/1923 | Schroth et al. | 173—116 |
| 1,502,375 | 7/1924 | Crum | 166—55.3 |
| 1,520,803 | 12/1924 | Brown | 166—99 |
| 1,615,172 | 1/1927 | Hoferer | 166—55.3 |
| 2,243,099 | 5/1941 | Johnson | 166—55.3 |
| 2,374,019 | 4/1945 | Kahler et al. | 173—114 X |
| 2,402,920 | 6/1946 | Seibold | 60—26.1 X |
| 2,459,808 | 1/1949 | Geyer | 153—80.5 |
| 2,629,445 | 2/1953 | Dill | 166—63 X |
| 2,640,546 | 6/1953 | Baker | 166—63 |
| 2,640,547 | 6/1953 | Baker et al. | 166—63 |
| 2,701,614 | 2/1955 | Ragan et al. | 166—63 |
| 2,877,822 | 3/1959 | Buck | 153—80.5 |
| 2,978,029 | 4/1961 | O'Reilly et al. | 166—63 |
| 3,047,071 | 7/1962 | Davis | 166—125 X |
| 3,055,430 | 9/1962 | Campbell | 166—63 X |
| 3,066,736 | 12/1962 | Venghiattis | 166—55.1 |
| 3,102,594 | 9/1963 | Crowe | 166—125 |
| 3,138,207 | 6/1964 | Peppers | 166—63 |

JACOB L. NACKENOFF, *Primary Examiner.*

CHARLES E. O'CONNELL, *Examiner.*

C. D. JOHNSON, D. H. BROWN, *Assistant Examiners.*